US008132920B2

(12) United States Patent
Li et al.

(10) Patent No.: US 8,132,920 B2

(45) Date of Patent: Mar. 13, 2012

(54) THIN MICROPROJECTOR WITH SWITCHED BEAM BENDER AND METHOD OF OPERATING THE SAME

(75) Inventors: Zili Li, Barrington, IL (US); Xiaodong Xun, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 981 days.

(21) Appl. No.: 11/687,884

(22) Filed: Mar. 19, 2007

(65) Prior Publication Data

US 2008/0273178 A1 Nov. 6, 2008

(51) Int. Cl.
*G03B 21/00* (2006.01)

(52) U.S. Cl. ................ 353/33; 353/31; 353/32; 353/34; 353/35; 353/36; 353/37; 353/122; 359/196.1; 359/201.1; 359/205.1; 359/665; 359/666; 359/670; 359/676; 359/831; 359/832; 359/237; 359/242

(58) Field of Classification Search .................... 353/98, 353/31, 32, 33, 34, 35, 36, 37, 122; 359/196.1, 359/201.1, 205.1, 665, 666, 670, 676, 831, 359/832, 237, 242, 649, 650, 651, 643
See application file for complete search history.

(56) References Cited

U.S. PATENT DOCUMENTS 5,715,021 A 2/1998 Gibeau et al.
5,772,301 A 6/1998 Kwon et al.
5,822,128 A * 10/1998 Sekine .......................... 359/650
5,842,762 A 12/1998 Clarke
5,902,030 A 5/1999 Blanchard
5,930,050 A 7/1999 Dewald
5,959,778 A 9/1999 Shimonura et al.
6,085,112 A 7/2000 Kleinschmidt et al.
6,188,522 B1 * 2/2001 Kimura et al. ................ 359/649
6,439,725 B1 8/2002 Na
6,637,896 B2 * 10/2003 Li et al. .......................... 353/119
6,769,772 B2 8/2004 Roddy et al.
6,833,951 B2 12/2004 Kolosowsky et al.
6,863,400 B1 3/2005 Liang
6,886,943 B1 5/2005 Greenberg et al.
6,995,889 B2 2/2006 Li et al.
7,182,463 B2 2/2007 Conner et al.

(Continued)

FOREIGN PATENT DOCUMENTS

GB 2407392 A 4/2005

(Continued)

OTHER PUBLICATIONS

PCT, " Notification of Transmittal of the International Search Report and the Written Opinion of the International Searching Authority, or the Declaration", Jul. 30, 2008, pp. 1-12, PCT/US2008/055751, European Patent Office.

(Continued)

*Primary Examiner* — Georgia Y Epps
*Assistant Examiner* — Sultan Chowdhury

(57) ABSTRACT

A video projector includes a reduced size spatial light modulator (400) that spatially modulates light from a light source (502) according to only a portion (e.g., ½) of a video frame at a time. A beam steerer (508, 600, 1600) steers spatially modulated light from the spatial light modulator to a correspond region (e.g., upper half, lower half) of a projection screen/surface (512) and one or more lenses (506, 510, 702, 802, 1002, 1008, 1100, 1300, 1502) insure that the spatially light modulator (400) is imaged onto the projection screen/surface (512).

15 Claims, 9 Drawing Sheets

100
108
104
106
102
T

U.S. PATENT DOCUMENTS

| | | | | |
|---|---|---|---|---|
| 7,224,411 | B2 | 5/2007 | Gibbon et al. | |
| 7,404,644 | B2 | 7/2008 | Evans et al. | |
| 7,510,284 | B2 | 3/2009 | Plut | |
| 7,837,333 | B2 | 11/2010 | Chou et al. | |
| 7,976,168 | B2 | 7/2011 | Nicolaescu et al. | |
| 2002/0141072 | A1* | 10/2002 | Moskovich | 359/663 |
| 2006/0017887 | A1 | 1/2006 | Jacobson et al. | |
| 2006/0055891 | A1 | 3/2006 | Florence et al. | |
| 2006/0082736 | A1 | 4/2006 | Grueger | |
| 2006/0209374 | A1* | 9/2006 | Willemsen | 359/205 |
| 2006/0279663 | A1 | 12/2006 | Wittenberg et al. | |
| 2007/0058143 | A1 | 3/2007 | Penn et al. | |
| 2008/0055566 | A1 | 3/2008 | Yun | |
| 2008/0284920 | A1 | 11/2008 | Facius et al. | |
| 2009/0231494 | A1 | 9/2009 | Nicolaescu et al. | |
| 2009/0231495 | A1 | 9/2009 | Xun et al. | |
| 2009/0257030 | A1 | 10/2009 | Klosowiak et al. | |
| 2010/0103332 | A1 | 4/2010 | Li et al. | |

FOREIGN PATENT DOCUMENTS

| | | | |
|---|---|---|---|
| WO | 02054148 | A2 | 7/2002 |
| WO | 2005074258 | A1 | 8/2005 |
| WO | 2006049771 | A2 | 6/2006 |

OTHER PUBLICATIONS

United States Patent and Trademark Office, "Non-Final Office Acton Summary" Oct. 28, 2010, pp. 1-12; U.S. Appl. No. 12/046,989.

United States Patent and Trademark Office, "Non-Final Office Action Summary", Dec. 9, 2010, pp. 1-24; U.S. Appl. No. 12/258,633.

United States Patent and Trademark Office, "Non-Final Office Action Summary", Sep. 15, 2010, pp. 1-13, U.S. Appl. No. 12/100,768.

* cited by examiner

THIN MICROPROJECTOR WITH SWITCHED BEAM BENDER AND METHOD OF OPERATING THE SAME

FIELD OF THE INVENTION

The present invention relates generally to video and image projection.

BACKGROUND

Perennial improvements in digital electronics, as described by Moore's Law, delivered forth the ubiquitous personal computer which has computing power comparable to supercomputers of the not so distant past, and for which a myriad of business, engineering, communication, entertainment and other applications have been developed.

At present, the unceasing progress in digital electronics has further progressed computer technology and brought forth handheld devices (e.g., smartphones) with sufficient computing power to run many of the most popular applications that have been run on personal computers. However, one hindrance in the migration of many applications to handheld devices, is the limited screen size of handheld devices, which makes protracted use of many applications (e.g., spreadsheets, text editing) impractical if not impossible.

It has previously been proposed to incorporate a small video projector within handheld electronic devices. For example such a device is disclosed in U.S. Pat. No. 6,637,896 to Li et al. FIG. 2 shows a handheld device with built in video projector being used to project a relatively large computer display image on a wall so that the displayed image can be easily viewed by two or more people. The current trend toward making handheld devices smaller and in particular thinner poses challenges to the proposition of including video projectors within handheld devices, particularly if it is desired to include a high resolution (e.g., mega pixel) video projector within a handheld device.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
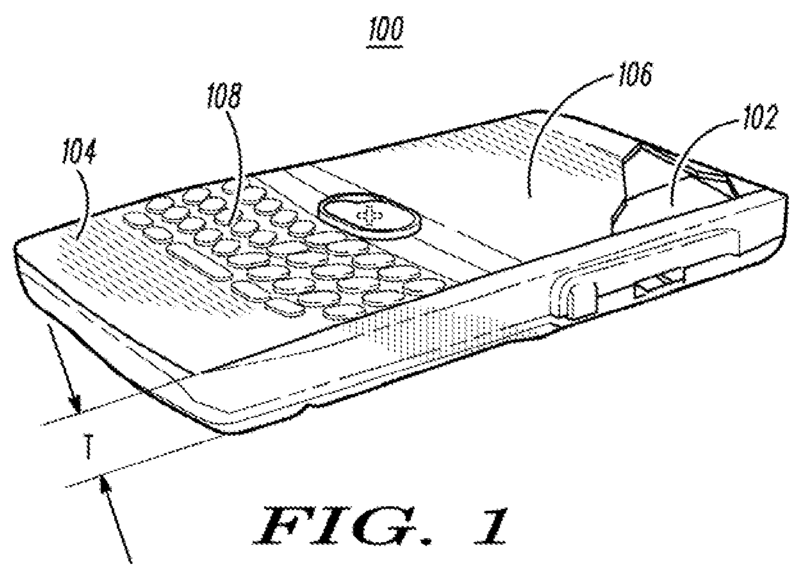
FIG. 1 is a thin smartphone with a built-in video projector according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to microprojectors. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of image processing for video projection described herein. The non-processor circuits may include, but are not limited to, a radio receiver, a radio transmitter, signal drivers, clock circuits, power source circuits, and user input devices. As such, these functions may be interpreted as steps of a method to perform image processing for video projection. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 2:
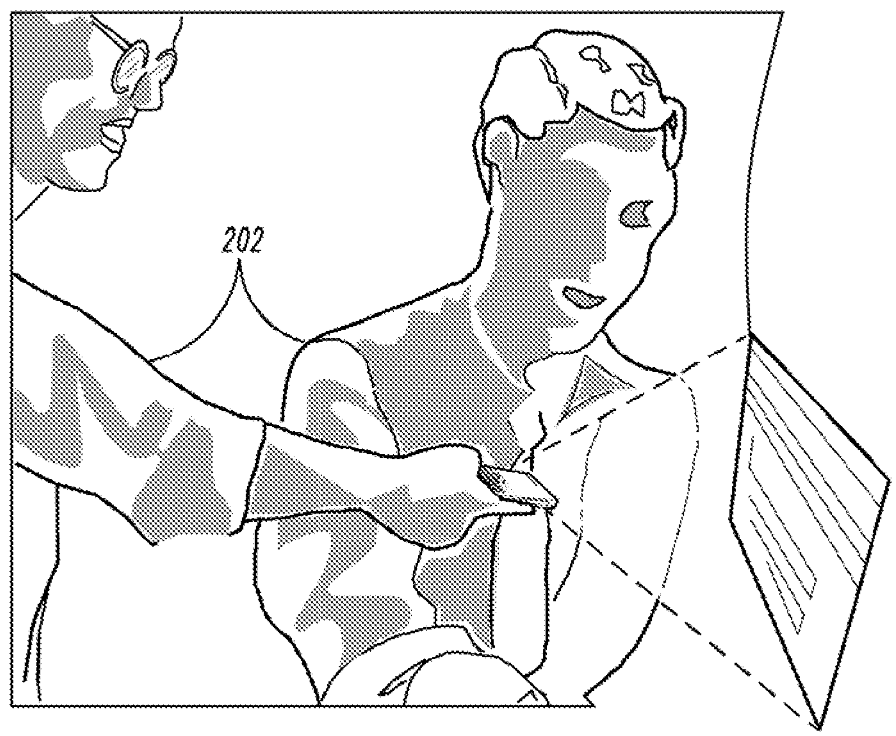
FIG. 2 depicts a mode of use of the thin smartphone with built-in projector shown in FIG. 1.

FIG. 1 is a thin smartphone 100 with a built-in video projector 102 according to an embodiment of the invention. Although a smartphone 100 is shown in FIG. 1 and described below, the teachings herein may be applied to other types of devices including, but not limited, portable video game consoles, Personal Digital Assistants, portable video game players, handheld computers and other handheld communication devices. The smartphone 100 has a small thickness, T, so that it can be conveniently carried in a pocket or purse and therefore the built-in video projector 102 must also be made thin. As shown in FIG. 1 the smartphone 100 includes a housing 104, a built-in Liquid Crystal Display (LCD) 106 and a keypad 108. FIG. 2 depicts a mode of use of the thin smartphone 100 with built-in projector 102 shown in FIG. 1. The projector 102 supplements the small LCD 106 of the smartphone 100. The projector 102 facilitates viewing of information received at, or stored in the smartphone by multiple users 202. One possible (if not necessary) arrangement of projector is such that an optical axis of a lens (discussed further below) of the projector 102 is parallel to the plane of the smartphone 100, and a spatial light modulator is located in a focal plane of the aforementioned lens, the focal plane being perpendicular to the plane of the smartphone. In such an arrangement at least one dimension (e.g., the height) of the light modulator is restricted by the thickness T of the smartphone 100. The goal of improved image fidelity dictates the use of higher resolution spatial light modulators. However, for a given aspect ratio (e.g., 4/3) and given pixel size, as resolution increases so does height which then dictates a greater handheld device thickness.

Figure 3:
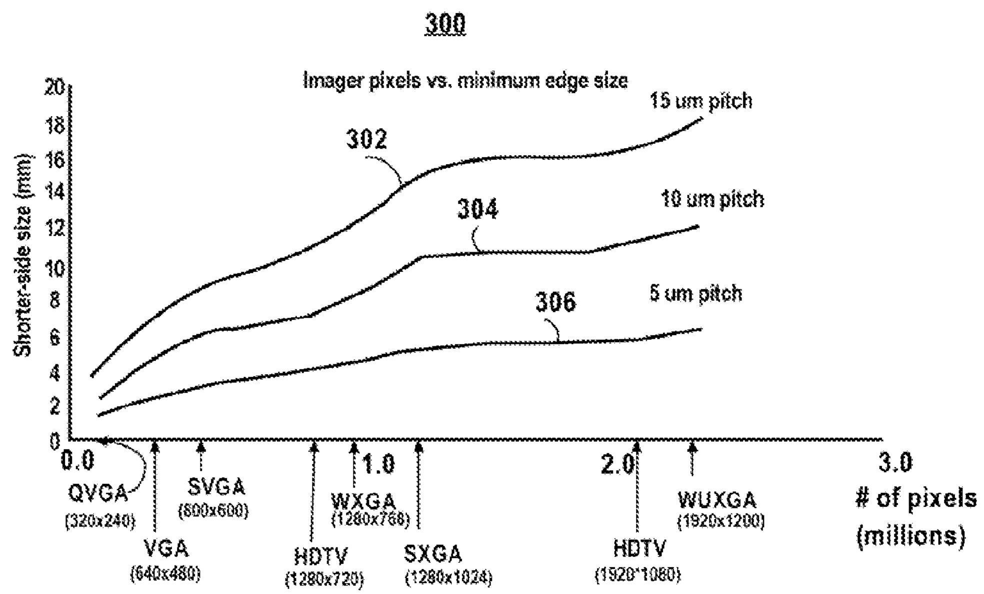
FIG. 3 is graph of the shortest dimension of spatial light modulators verses pixel count in mega pixels.

FIG. 3 is graph 300 of the shortest dimension of spatial light modulators verses pixel count in megapixels. Various standard video format dimensions are marked along the abscissa of the graph 300. The graph 300 includes a first plot 302 for 15 micron pixel pitch modulators, a second plot 304 for 10 micron pixel pitch modulators, and a third plot 306 for 5 micron pixel pitch modulators. Smaller pixel pitches are generally associated with reduced transmission efficiency because a dark area associated with the pixel drive electronics can not be proportionally reduced. Consequently there is an incentive to use a larger pixel pitch in the interest of achieving brighter projectors, however this is opposed by the desire to limit the thickness of the device in which the projector is incorporated.

Referring to the graph it is seen that for microdisplays ranging from 320×240 up to 1920×1200 the shortest dimension varies from about 2 mm to about 18 mm. In reviewing the graph 300 it should be kept in mind that handheld electronic devices are typically between 5 mm and 20 mm thick and that some high end models are characterized by thickness in the lower end of this range. In the case of clamshell or slider type devices a projector would typically be accommodated in one of two relatively moveable parts of the device, and the thickness of these parts is on average one-half of the total thickness. Moreover, a few millimeters must be added to the ordinate of the graph 300 to allow for the thickness of, at least, the housing walls of the handheld device, if not for other supporting structure as well.

Figure 4:
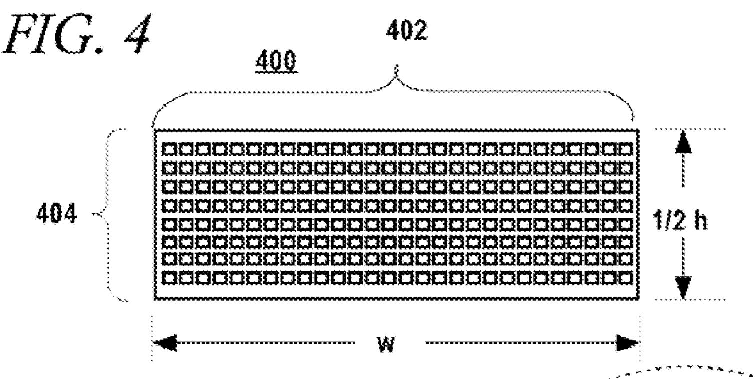
FIG. 4 shows a half-height spatial light modulator used in the projector in the smartphone shown in FIG. 1 according to an embodiment of the invention.

FIG. 4 shows a half-height spatial light modulator 400 used in the projector in the smartphone 100 shown in FIG. 1 according to an embodiment of the invention. The spatial light modulator 400 comprises a plurality of columns 402 of pixels and a plurality of rows 404 of pixels but the plurality of rows 404 is a fraction (i.e., ½ in the case of FIG. 4) of a total number pixel rows that a projector (described below) in which the modulator 400 is used is capable of displaying. In the embodiment shown in FIG. 4 it is the height of the spatial light modulator 400 that is reduced because, inter alia, the height is the smallest dimension in all standard video formats. Moreover, if the height dimension of the modulator 400 is aligned with the thickness direction T of the smartphone 100, an upright image can be projected while holding the smartphone 100 in a horizontal plane with the keypad 108 of the smartphone 100 accessible and visible to the user 202. The spatial light modulator can for example comprise a Digital Light Processing (DLP™), a Liquid Crystal on Silicon (LCOS), or a transmissive liquid crystal spatial light modulator for example.

Figure 5:
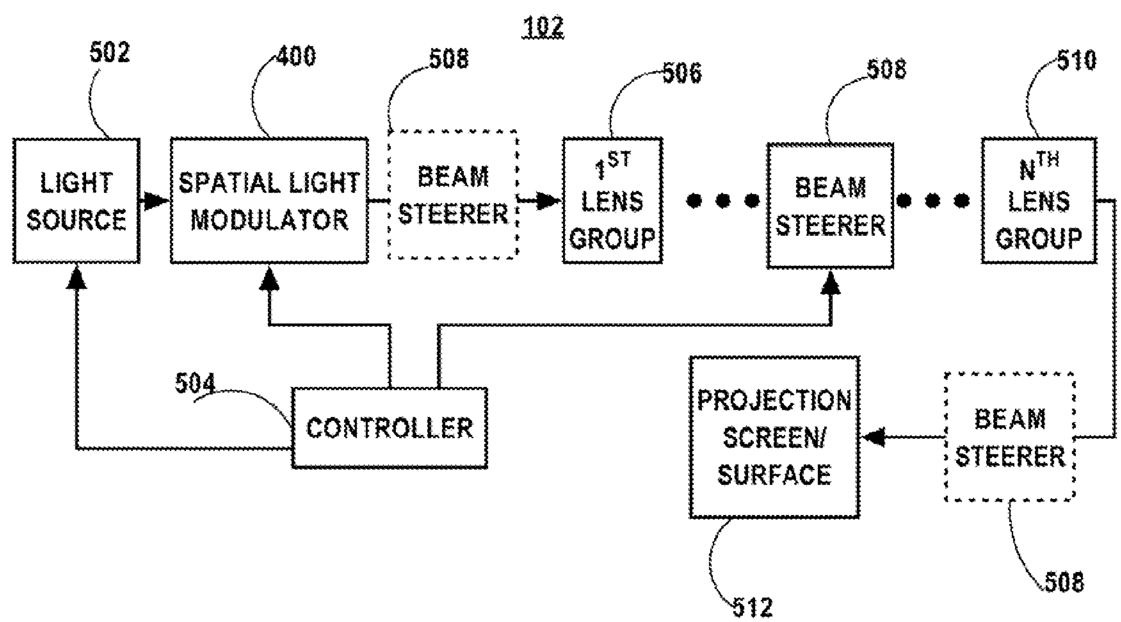
FIG. 5 is a block diagram of the projector used in the smartphone shown in FIG. 1 according to an embodiment of the invention.

FIG. 5 is a block diagram of the projector 102 used in the smartphone 100 shown in FIG. 1 according to an embodiment of the invention. As shown in FIG. 5, the projector 102 comprises a light source 502 optically coupled to the spatial light modulator 400. The light source 502 can for example comprise a single white LED or multiple separate color LEDs that couple light to the spatial light modulator 400 through a color combiner.

A controller 504 is coupled to the spatial light modulator 400. The controller 504 is adapted to drive the spatial light modulator 400 to modulate light in order to produce video sub-frame images. For example in the case shown in FIG. 4 in which the spatial light modulator 400 is ½ height the spatial light modulator 400 will be driven by the controller 504 to produce ½ of a video frame at a time. The spatial light modulator 400 will be driven to present an upper half of the video frame, then a lower half of the video frame, then the upper half again and so on. The spatial light modulator 400 is optically coupled (e.g., by free space propagation) to a first lens group 506. The first lens group 506 is optically coupled to a beam steerer 508 and the beam steerer is optically coupled to an $N^{TH}$ lens group 510. The first lens group 506 through the $N^{TH}$ lens group 510 serve to image the spatial light modulator 400 onto a projection screen/surface 512. Although only two lens groups 506, 510 are shown, in practice, as denoted by the designator "$N^{TH}$", more than two lens groups can be used. Alternatively, only one lens group is used. Alternatively, in lieu of one or more lens other types of imaging optical elements such as mirrors or diffractive optical elements are used. Alternate, positions for the beam steerer 508 are indicated by dashed outline boxes in FIG. 5.

The beam steerer 508 serves to steer a spatially modulated light beam emanating from the spatial light modulator 400 through the $N^{TH}$ lens group 510. In the case of the ½ height spatial light modulator 400 shown in FIG. 4 the beam steerer 508 has two active states—an UP state in which the spatially modulated light beam is steered to an upper half of the projection screen/surface 512 and a DOWN state in which the spatially modulated light beam is steered to a lower half of the projection screen/surface 512. When the beam steerer 508 is in the UP state, the spatial light modulator 400 is driven by the controller 504 to spatially modulate light according to one half of a video frame, which may be the upper half or lower half depending on the design of the lens groups 506, 510, i.e., depending on whether the lens groups make up an erecting or inverting lens. When the beam steerer is in the DOWN state, the spatial light modulator 400 is driven by the controller to spatially modulate light according to the remaining half. In a field sequential color system the beam steerer 508 can be held in one of the states while all three (or more) colors are successively used to illuminate the spatial light modulator 400, or alternatively the beam steerer 508 can be switched to the two states while each color is maintained. The controller 504 is also coupled to the beam steerer 508 and controls steering of the spatially modulated light beam by the beam steerer 508. Additionally the controller 504 is coupled to the light source 502 and in the case of field sequential operation the controller also coordinates turning on different colors (e.g., red, green, blue) with driving the spatial light modulator 400.

Figure 6:
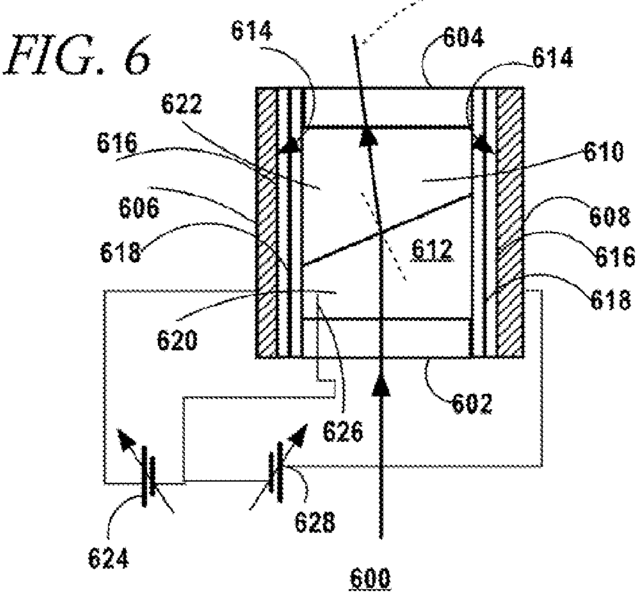
FIG. 6 shows an electrowetting microprism type beam steerer that is used in the projector in the smartphone shown in FIG. 1 according to an embodiment of the invention.

FIG. 6 shows an electrowetting microprism 600 type beam steerer that is used in the projector 102 in the smartphone 100 shown in FIG. 1 according to an embodiment of the invention. The microprism 600 comprises a first window 602 through which the spatially modulated light beam enters and a second window 604 through which the spatially modulated light beam exits. A left side wall 606 and a right side wall 608 extend between the first window 602 and the second window 604, forming a chamber 610. The chamber 610 is closed by a first end wall (not shown) located above the plane of the drawing and a second end wall 612 located below the plane of the paper. The first end wall and the second end 612 wall are suitably made out of an insulating material, so as not to short circuit the left side wall 606 and the right side wall 608 which are conductive. Inside surfaces 614 of the left side wall 606 and right side wall 608 are covered with an electrically insulating layer 616. One suitable choice of material for the left side wall 606 and right side wall 608 is silicon, in which case the electrically insulating layer 616 can be an oxide ($SiO_2$) grown on the silicon. The insulating layer 616 is covered with a hydrophobic layer 618 (e.g., an amorphous fluoropolymer). The chamber 610 encloses two immiscible transparent liquids including a conductive liquid 620 and an insulating non-polar liquid 622. The two liquids 620, 622 have differing indices of refraction. A first voltage supply 624 is coupled between a probe 626 that is in contact with the conductive liquid 620 and the left side wall 606; and a second voltage supply 628 is coupled between the probe 626 and the right side wall 608. Varying the voltages on the left side wall 606 and right side wall 608 will vary the contact angle of the conductive liquid 620 with the side walls 606, 608. The voltages are suitably adjusted to make the contact angles at the side wall 606, 608 equal in magnitude but opposite in sign so as to form a substantially planar meniscus, that will refract the spatially modulated light beam without causing substantial distortion. The planar meniscus is an optical interface between the conductive liquid 620 and the insulating liquid 622. Voltages required to obtain specified contact angles can be computed using the parallel plate electrowetting equation:

$$\cos(\theta_v) = \cos(\theta_0) + \frac{1}{2}\frac{\varepsilon}{\gamma}\frac{V^2}{d}$$

where, $\theta_0$ is the contact angle with no voltage;
$\epsilon$ is the electric permittivity
$\gamma$ is the surface tension
d is the thickness of the insulating layers
V is the applied voltage; and
$\theta_v$ is the contact angle with the voltage applied.

Electrowetting microprisms are described in more detail in Neil R. Smith et al., "Agile wide angle beam steering with electrowetting microprisms" Optics Express 6557, Vol. 14, No. 14, 10 Jul. 2006.

Figure 7:
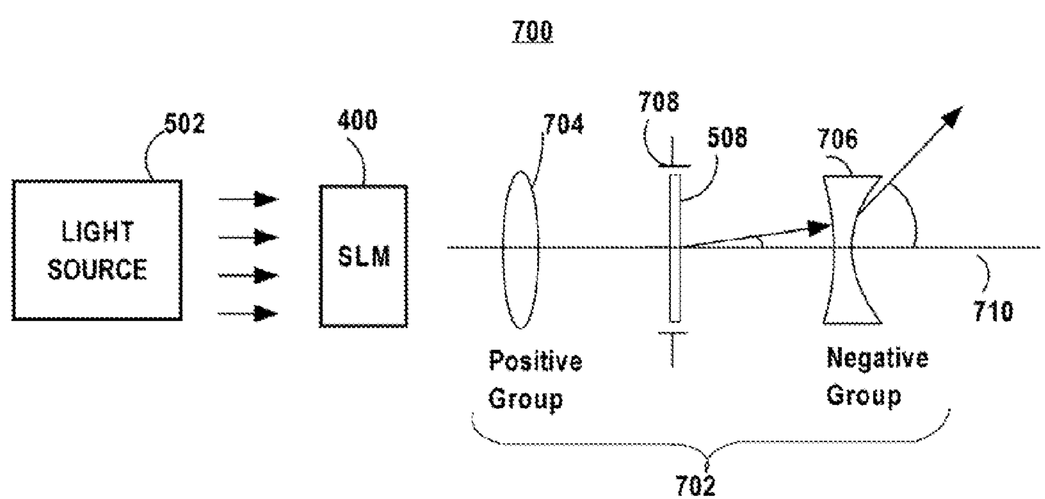
FIG. 7 is a schematic diagram of projector optics used in the projector shown in FIG. 5 according to an embodiment of the invention.

FIG. 7 is a schematic diagram of projector optics 700 used in the projector 102 shown in FIG. 5 according to an embodiment of the invention. The projector optics 700 include an inverted telephoto lens 702 that includes a positive group 704 following the spatial light modulator 400, and followed by the beam steerer 508, which is followed by a negative lens group 706. In this embodiment the beam steerer 508 need only steer the spatially modulated light by a small angle because the negative group 706 serves to increase the angle of light exiting the lens 702. The beam steerer is located at a stop location 708 at which chief rays from all object points theoretically crosses an optical axis 710.

Figure 8:
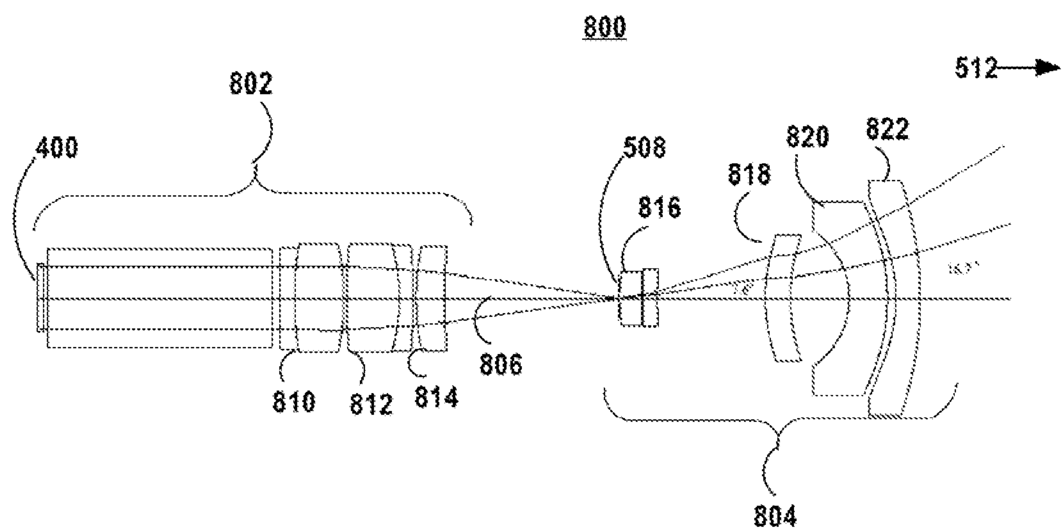
FIG. 8 is a lens diagram of a lens used in the projector optics shown in FIG. 7 according to an embodiment of the invention.

FIG. 8 is a lens diagram of a lens 800 used in the projector optics shown in FIG. 7 according to an embodiment of the invention. The lens 800 includes a multi-element positive group 802 followed by a multi-element negative group 804 along an optical axis 806. The positive group 802 includes a first doublet 810, followed by a second doublet 812, followed by a first meniscus lens 814. The negative group 804 comprises a third doublet 816 followed by a second meniscus lens 818, a third meniscus lens 820 and a fourth meniscus lens 822. A zero-power cylinder 808 is located between the spatial lens modulator 400 and the first doublet 810. The zero-power cylinder 808 is a stand-in for a Philips prism that is used in modeling the lens 800. A Philips prism is a device for illuminating reflective-type spatial light modulators without obstructing the imaging optical path of a projection lens.

Figure 9:
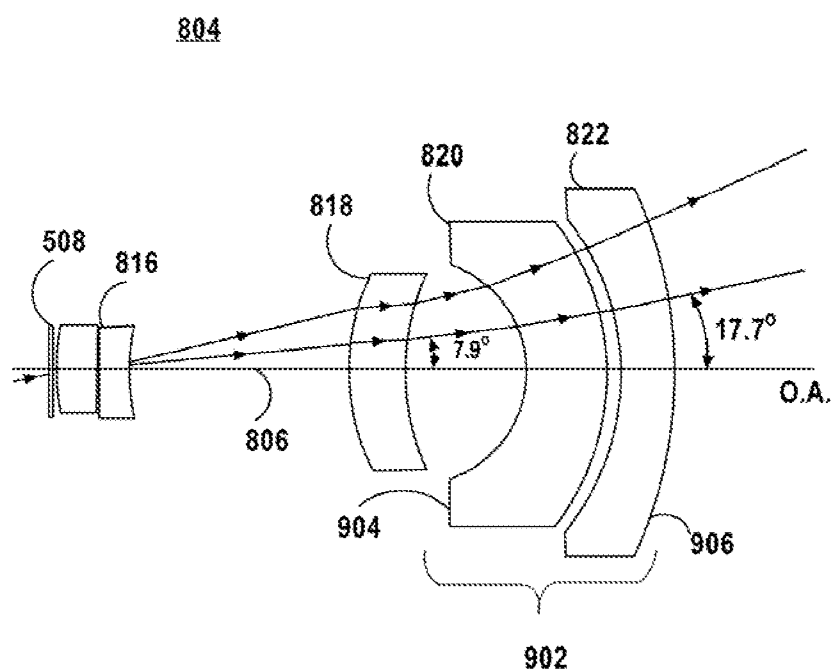
FIG. 9 is a lens diagram of a negative lens group used in the lens shown in FIG. 8 according to an embodiment of the invention.

FIG. 9 is a lens diagram of the negative lens group 804 used in the lens shown in FIG. 8 according to an embodiment of the invention. In FIG. 9 an increase in the angle of light rays propagating through the negative group 804 relative to an optical axis 802 is apparent. FIG. 9 shows paths of light rays when the beam steerer 508 is in the UP state. A final negative lens sub-group 902 that includes the third meniscus lens 820 and the fourth meniscus lens 822 serves to increase the angles of rays that result from beam steering. Accordingly, the beam steerer 508 need only steer light through a small angle and dispersion caused by the beam steerer, if any, can more easily be maintained within acceptable limits.

According to the embodiments described with reference to FIGS. 7-9 sub-frame areas are tiled on the projection screen/surface 512. In contrast, in the embodiments shown in FIGS. 10-12 sub-frame areas are tiled within a lens system. In other words, the beam steerer 508 is used to alter the position of a relay image of the spatial light modulator 400 which is, in turn, projected onto the projection screen/surface 512.

Figure 10:
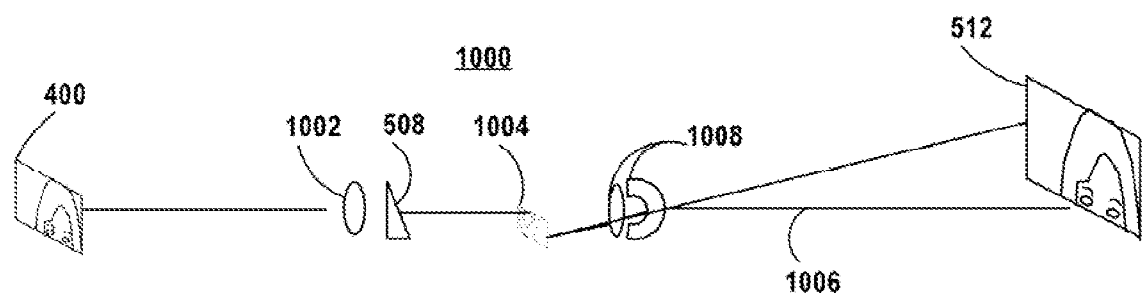
FIG. 10 is a schematic of projector optics used in the projector shown in FIG. 5 according to an alternative embodiment.

FIG. 10 is a schematic of projector optics 1000 used in the projector 102 shown in FIG. 5 according to an alternative embodiment. As shown in FIG. 10 spatially modulated light that is modulated by the spatial light modulator 400 is imaged by a relay lens 1002 forming a real relay image 1004. The beam steerer 508 is located between the relay lens 1002 and the relay image 1004. Setting the beam steerer 508 to the UP state positions the relay image 1004 above an optical axis 1006, whereas setting the beam steerer 508 to the DOWN state positions the relay image below the optical axis 1006. A projection lens 1008 projects the relay image 1004 onto a projection screen/surface 512. The relay image formed when the beam steerer 508 is in the UP state will be projected on to a lower region of the projection screen/surface 512 and the relay image formed when the beam steerer 508 is in the DOWN state will be projected on to an upper region of the projection screen/surface 512. Alternatively if projection lens 1008 is made erecting then the foregoing relations will be reversed. The full projected image will have twice the pixel count height as the spatial light modulator 400 because the projected image derives from two separate steered relay images.

Figures 11, 12:
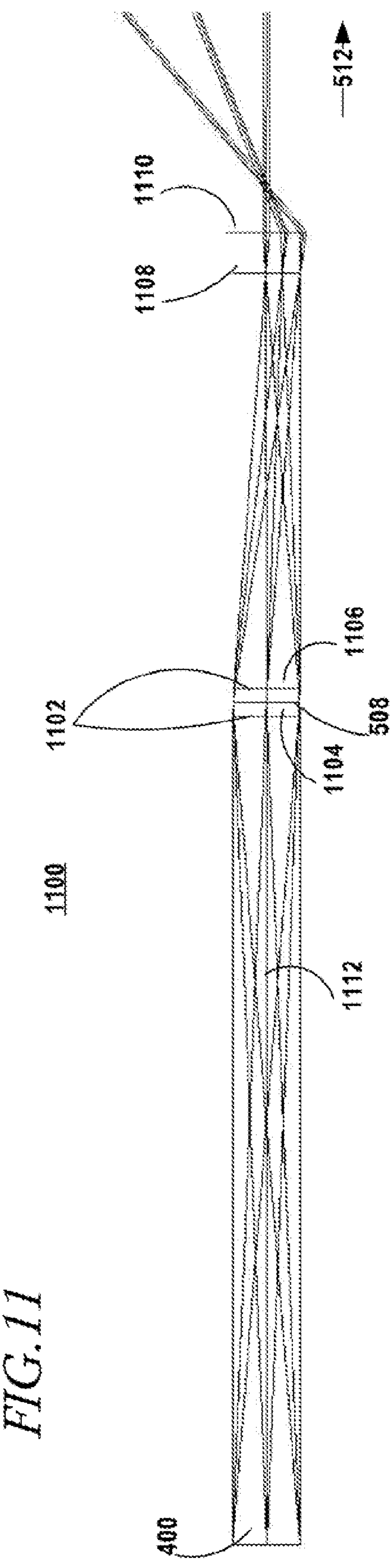
FIG. 11 is a schematic lens diagram of an alternative lens for the projector shown in FIG. 5, with a beam steerer in an UP state.
FIG. 12 is a schematic lens diagram of the lens shown in FIG. 11 with the beam steerer in a DOWN state.

FIG. 11 is a schematic lens diagram of an alternative lens 1100 for the projector 102 shown in FIG. 5, with the beam steerer 508 in an UP state and FIG. 12 is a schematic lens diagram of the lens 1100 shown in FIG. 11 with the beam steerer 508 in a DOWN state. The lens 1100 shown in FIGS. 11-12 comprises a relay lens 1102 that includes a first group 1104 and a second group 1106. (Each of the first group 1104 and second group 1106 can include a single element or multiple elements.) The beam steerer 508 is located between the first group 1104 and the second group 1106. The relay lens 1102 forms a relay image 1108 that is imaged by a projection lens 1110 onto the projection screen/surface 512. The above mentioned components are arranged along an optical axis 1112. As shown in FIG. 11, the beam steerer 508 is in the UP state and the relay image 1108 is located above the optical axis 1112. As shown in FIG. 12, the beam steerer 508 is in the DOWN state and the relay image 1008 is located below the optical axis 1112.

Figure 13:
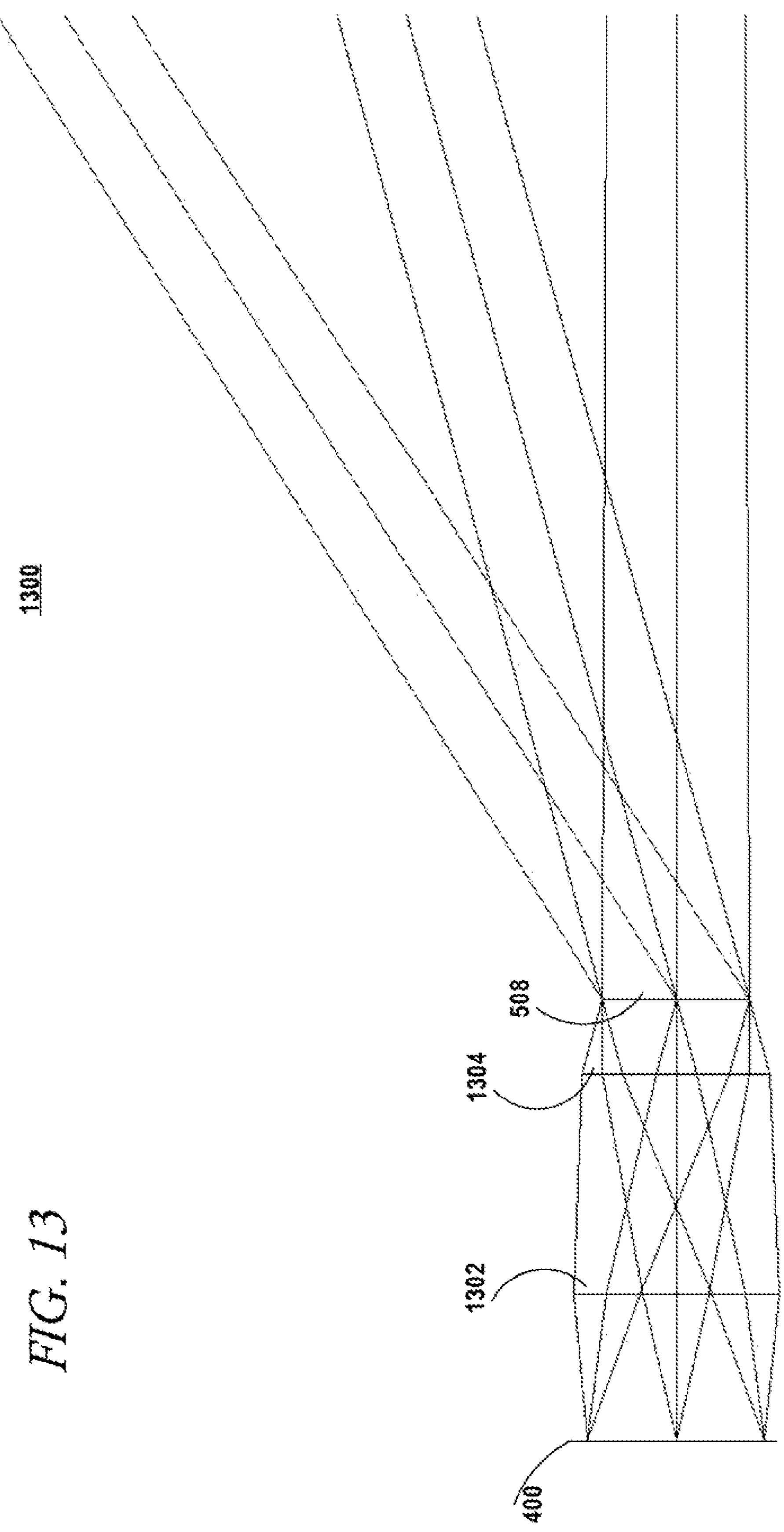
FIG. 13 is schematic lens diagram of another alternative lens for the projector shown in FIG. 5, with a beam steerer in the UP state.
Figure 14:
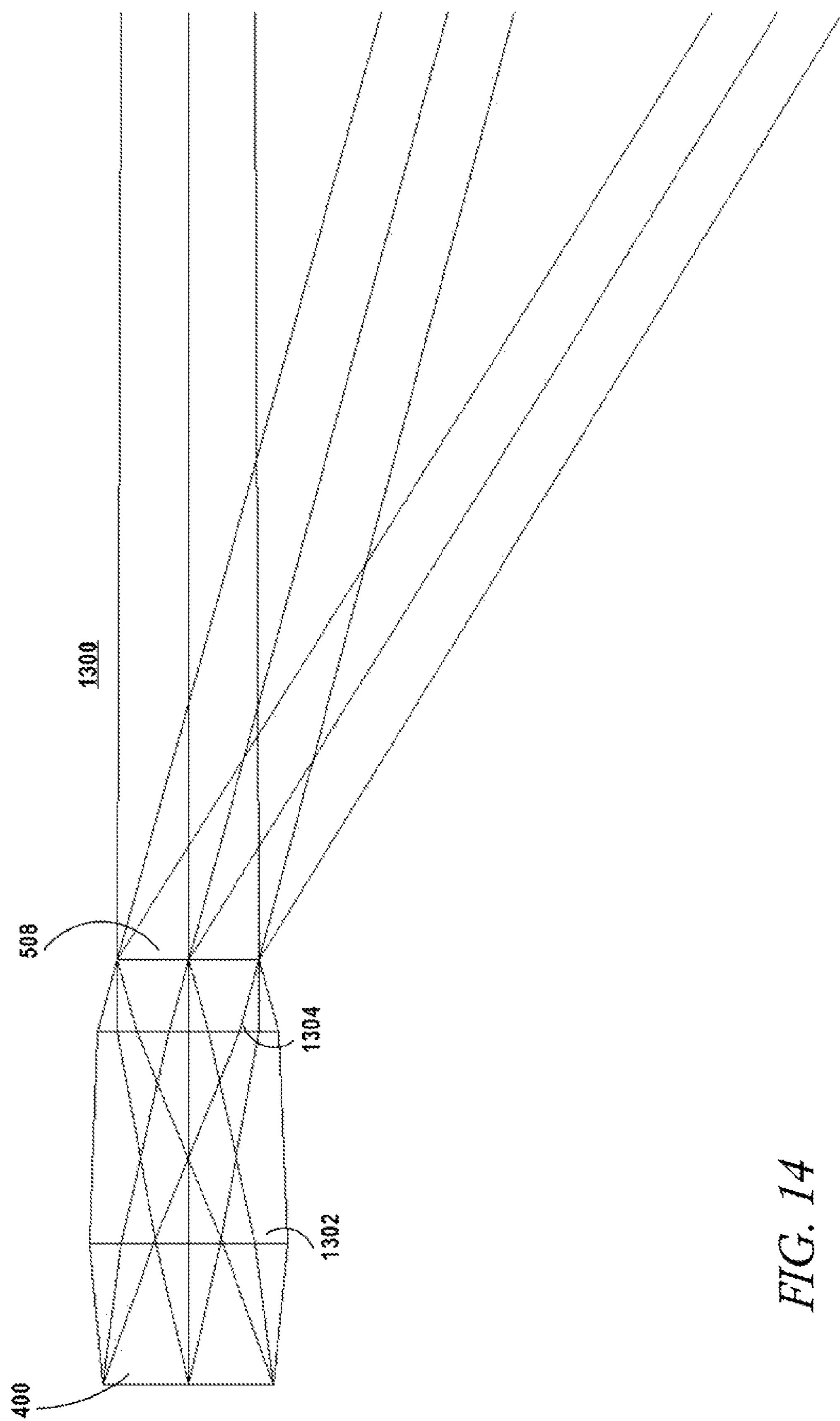
FIG. 14 is schematic lens diagram of the lens shown in FIG. 12 with the beam steerer in the DOWN state.

FIG. 13 is schematic lens diagram of another alternative lens 1300 for the projector shown in FIG. 5, with the beam steerer 508 in the UP state and FIG. 14 is schematic lens diagram of the lens 1300 shown in FIG. 13 with the beam steerer 508 in the DOWN state. In the arrangement shown in FIGS. 13 and 14 the lens 1300 has a first element 1302 (or group) and a second element 1304 (or group) and the beam steerer 508 is located between the last lens element, i.e., the second element 1304 and the projection screen/surface 512 which is located at a distance to the right beyond the bounds of FIGS. 13 and 14.

Figure 15:
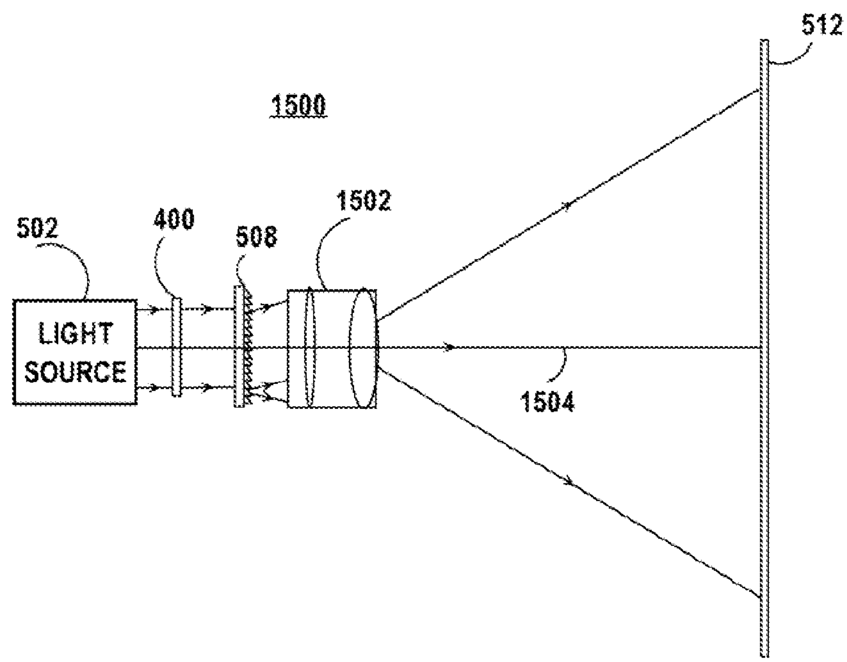
FIG. 15 is a schematic of a projector according to an alternative embodiment.

FIG. 15 is a schematic of a projector 1500 according to an alternative embodiment. In the arrangement shown in FIG. 15 the light source 502, spatial light modulator 400, beam steerer 508, a projection lens 1502 and the projection screen/surface 512 are arranged in the foregoing order along an optical axis 1504. The beam steerer 508 steers the spatially modulated light through the projection lens 1502. Note that in this embodiment the beam steerer 508 precedes any lens elements.

Figure 16:
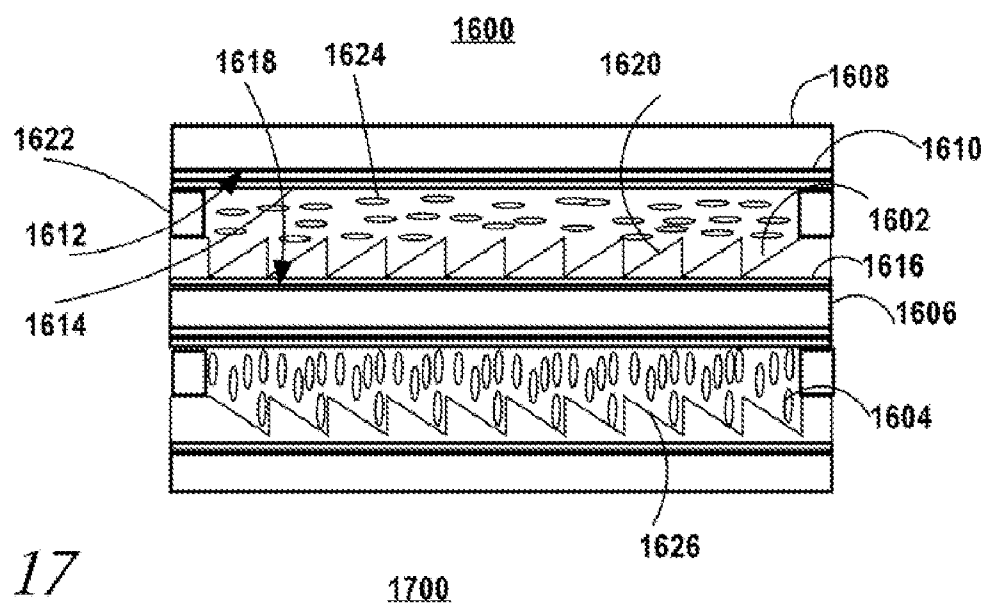
FIG. 16 is sectional elevation view of a blazed grating liquid crystal beam steerer that used in projectors according to alternative embodiments of the invention.

FIG. 16 is sectional elevation view of a blazed grating liquid crystal beam steerer 1600 that used in projectors according to alternative embodiments of the invention. The beam steerer 1600 includes an upper cell 1602 and a lower cell 1604. As shown in FIG. 16 the upper cell 1602 and the lower cell 1604 share a common wall 1606, though this need not be the case. In addition to the common wall 1606 the upper cell 1602 includes an upper wall 1608. The common wall 1606 and the upper wall 1608 are transparent to allow passage of the spatially modulated light beam. A first transparent conductive layer 1610 (e.g., ITO) is coated on an inside surface 1612 of the upper wall 1608. A liquid crystal alignment layer 1614 is coated over the transparent conductive layer 1610. A second transparent conductive layer 1616 is supported on an inside surface 1618 of the common wall 1606 facing the upper cell 1602. A blazed transmission grating 1620 is supported on the second transparent conductive layer 1616. A side wall 1622 joins the common wall 1606 and the upper wall 1608. The upper cell 1602 as well as the lower cell 1604 is filled with a nematic liquid crystal 1624. When a voltage is applied between the first transparent conductive layer 1610 and the second transparent conductive layer 1616 the nematic liquid crystal 1624 partially aligns with the resulting electric field, thereby changing the effective index of refraction for light polarized parallel to a rubbing direction of the alignment layers. At a certain voltage the effective index of refraction of the nematic liquid crystal 1624 matches the index of refraction of the blazed transmission grating 1620 so that the blazed transmission grating effectively disappears and the upper cell 1602 acts as an optical window. Thus, in one state the upper cell 1602 will transmit the spatially modulated light beam undisturbed and in another state the blazed transmission grating 1620 will steer the spatially modulated light into an order for which the grating 1620 is blazed (e.g., the first order).

The lower cell 1604 has the same design as the upper cell 1602 but has a second blazed transmission grating 1626 that is blazed in a direction opposite to that of the blazed transmission grating 1620 in the upper cell 1602. Thus, the lower cell 1604 will steer the spatially modulated light to an opposite angle. Thus, one of the cells 1602, 1604 can be used to achieve the UP state and the other of the cells 1602, 1604 can be used to achieve the DOWN state. Blazed grating liquid crystal beam steerers are described in Xu Wang et al, "Liquid-crystal blazed-grating beam deflectors", Applied Optics, Vol. 39, No. 35, PP 6545-6555, 10 Dec. 2000.

Although two types of beam steerers are shown in FIGS. 6 and 16 and described in hereinabove in some detail, the invention should not be construed as limited to using these particular types of beam steerers.

Figure 17:
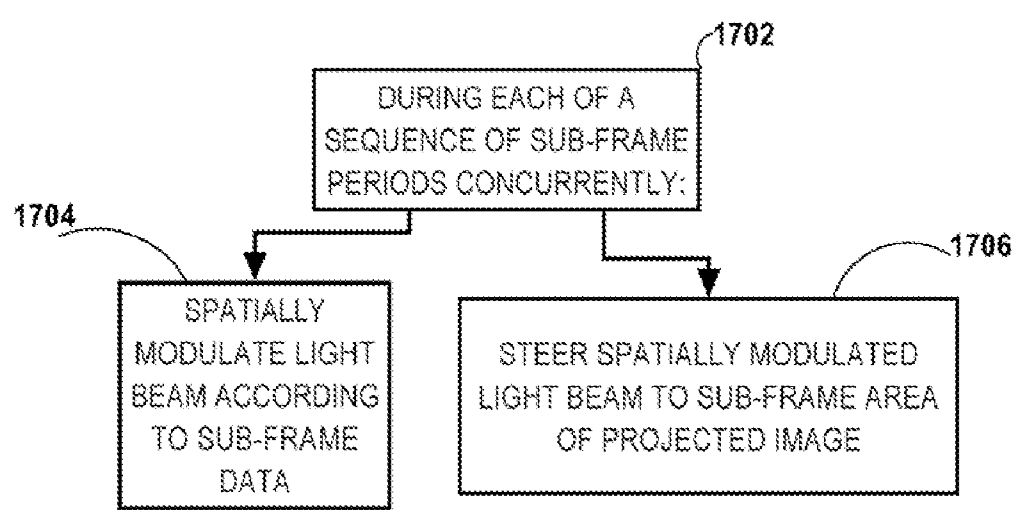
FIG. 17 is a flowchart showing a method of projecting video images according to embodiments of the invention.

FIG. 17 is a flowchart 1700 showing a method of projecting video images according to embodiments of the invention. As indicated in block 1702 during each of a succession of sub-frame periods (e.g., one-half frame periods), in block 1704 a light beam is spatially modulated according to sub-frame (e.g., one-half frame) data, and concurrently in block 1706 the light beam steered (e.g., through a projection lens) to a sub-frame area (e.g., upper or lower half) of a projected image.

Although the embodiments described above, steer spatially modulated light in two vertical directions, i.e., up and down, alternatively, spatially modulated light is steered in more than two vertical directions and moreover, alternatively spatially modulated light is steered in different horizontal directions as well. In each case, for each direction that the spatially modulated light is steered the spatial light modulator 400 will be driven with video data for the sub-frame region that the steered spatially modulated light illuminates. By definition, the spatially modulated light includes at least two pixels, an more likely includes at least one hundred pixels. For example, one-half of the HDTV format of 1920×1080 includes 1,036,800 pixels and $1/16^{TH}$ includes 129,600 pixels. According to embodiments of the invention spatially modulated light beams are modulated by an array of pixels that includes multiple rows of pixels and multiple columns of pixels.

Although the invention has been described above in the context of handheld electronic devices, e.g., smartphone 100, video projectors according to the teachings hereinabove may also be used in larger systems such as used in home theaters or movie theatres.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A projector comprising:

a light source:

a spatial light modulator optically coupled to the light source whereby said spatial light modulator receives light from said light source and wherein said spatial light modulator is adapted to produce spatially modulated light;

an imaging optical device optically coupled to said spatial light modulator, wherein said imaging optical device comprises an object plane and receives said spatially modulated light from said spatial light modulator, and wherein said imaging optical device is adapted to image said spatially modulated light;

a beam steerer arranged to intercept said spatially modulated light, wherein said beam steerer is adapted to steer said spatially modulated light;

a controller coupled to said spatial light modulator and said beam steerer, wherein said controller is adapted to drive said spatial light modulator according to a first portion of a video frame while driving said beam steerer to steer said spatially modulated light in a first direction, and to drive said spatial light modulator according to a second portion of said video frame while driving said beam steerer to steer said spatially modulated light in a second direction; and a relay lens disposed between said spatial light modulator and said imaging optical device;

wherein, said relay lens has a object plane located at said spatial light modulator and an image plane that is coincident with said object plane of said imaging optical device.

2. The projector according to claim 1 wherein:

said imaging optical device comprises an inverted telephoto lens.

3. The projector according to claim 2 wherein said inverted telephoto lens comprises a positive group and a negative group and said beam steerer is located between said positive group and said negative group.

4. The projector according to claim 3 wherein said beam steerer is located at a stop location at which chief rays from all points on said spatial light modulator cross an optical axis of said lens.

5. The projector according to claim 1 wherein said imaging optical device is a multi-element lens comprising a first element and a second element and said beam steerer is located between said first element and said second element.

6. The projector according to claim 1 wherein said beam steerer comprises: a liquid crystal device.

7. The projector according to claim 1 wherein said beam steerer comprises: an electrowetting prism.

8. A projector comprising:

a light source:

a spatial light modulator optically coupled to the light source whereby said spatial light modulator receives light from said light source and wherein said spatial light modulator is adapted to produce spatially modulated light;

an imaging optical device optically coupled to said spatial light modulator, wherein said imaging optical device receives said spatially modulated light from said spatial light modulator and wherein said imaging optical device is adapted to image said spatially modulated light;

a beam steerer comprising an electrowetting prism, the beam stearer arranged to intercept said spatially modulated light, wherein said beam steerer is adapted to steer said spatially modulated light;

a controller coupled to said spatial light modulator and said beam steerer, wherein said controller is adapted to drive said spatial light modulator according to a first portion of a video frame while driving said beam steerer to steer said spatially modulated light in a first direction, and to drive said spatial light modulator according to a second portion of said video frame while driving said beam steerer to steer said spatially modulated light in a second direction.

9. A method of projecting an image comprising:

during each of a sequence of sub-periods of a frame duration, spatially modulating light to form a spatially modulated light beam that includes a plurality of pixels but less than a complete frame of pixels;

during each of the sequence of sub-periods steering the spatially modulated light beam so that it is projected to a sub-region of said complete frame of pixels that includes said plurality of pixels.

10. The method according to claim 9 wherein each of said sequence of sub-periods is one-half of said frame duration and said sub-region is one-half of said complete frame of pixels.

11. The method according to claim 9 wherein steering comprises steering the spatially modulated light beam through a projection lens.

12. The projector according to claim 8 wherein:

said imaging optical device comprises an inverted telephoto lens.

13. The projector according to claim 12 wherein said inverted telephoto lens comprises a positive group and a negative group and said beam steerer is located between said positive group and said negative group.

14. The projector according to claim 13 wherein said beam steerer is located at a stop location at which chief rays from all points on said spatial light modulator cross an optical axis of said lens.

15. The projector according to claim 8 wherein said imaging optical device is a multi-element lens comprising a first element and a second element and said beam steerer is located between said first element and said second element.

* * * * *